UNITED STATES PATENT OFFICE.

MAX ROLOFF, OF HAGEN, GERMANY.

IRON ELECTRODE.

934,839.  Specification of Letters Patent.  Patented Sept. 21, 1909.

No Drawing.  Application filed October 28, 1904. Serial No. 230,439.

*To all whom it may concern:*

Be it known that I, MAX ROLOFF, residing in 21 Buscheystrasse, Hagen, in the Province of Westphalia, Germany, a subject of the King of Prussia, have invented certain new and useful Improvements in Iron Electrodes, of which the following is a specification.

The present invention relates to iron electrodes for alkaline accumulators and to their production.

For the negative electrodes of alkaline accumulators it is of advantage to employ a specially finely divided iron which is reduced in caustic potash from its oxygen compounds. Experiment, however, shows that all the oxids of iron are not reduced by the electric current. In the majority of cases one has to deal with a mixture of iron oxids and it happens that such iron oxids as are reducible in a pure condition cannot be reduced at all, or can only be partially reduced, in the mixture because the non-reduced oxids do not conduct the electric current and consequently place the reducible oxid, which is in the mixture out of contact with the conductors of the electrode supplying the current. Common forge-scales or hammerslag belongs to these mixtures, in its raw condition it being capable of being only slightly employed. The same contains the three iron compounds, ferrous oxid $FeO$, ferric oxid $Fe_2O_3$ and magnetic oxid $Fe_3O_4$. Of these compounds the first two are with difficulty reducible; on the other hand the applicant has found that the latter compound employed in the pure condition can be easily and perfectly reduced by the electric current in alkaline lye. The same is distinguished from the other two compounds by the fact that it is attracted by magnets whereas the two others are not influenced by magnets.

According to the present invention iron electrodes for alkaline accumulators are consequently formed by first crushing or pulverizing common forge-scales or hammerslag to an exceedingly fine powder, the coarser powder being separated off by a sieve and further triturated. This exceedingly fine powder is divided into two portions by the aid of steel magnets, electro-magnets or solenoids so that one portion contains only powder the separate particles of which are attracted by magnets. With this powder which may be compressed into cakes, suitably by means of presses, the hollow spaces of iron grids or pockets are filled, these grids or pockets being such as are commonly employed as electrodes for such accumulators. The electrodes are then suspended in an alkaline lye and the electric current is allowed to operate. By means of the electric current the powder is reduced to very effective iron-sponge.

What I claim is:—

Active material for negative pole plates of alkaline accumulators consisting of magnetic oxid of iron magnetically derived from forge-scale and free from non-magnetic ingredients of the scale.

In witness whereof, I have hereunto signed my name in the presence of two subscribing witnesses.

MAX ROLOFF.

Witnesses:
 OTTO KÖNIG,
 F. A. RITTERSHAUS.